W. A. HENDERSON & W. C. & A. M. GILPIN.
SELF ADJUSTING BEARING.
APPLICATION FILED APR. 12, 1910.
1,000,806.
Patented Aug. 15, 1911.
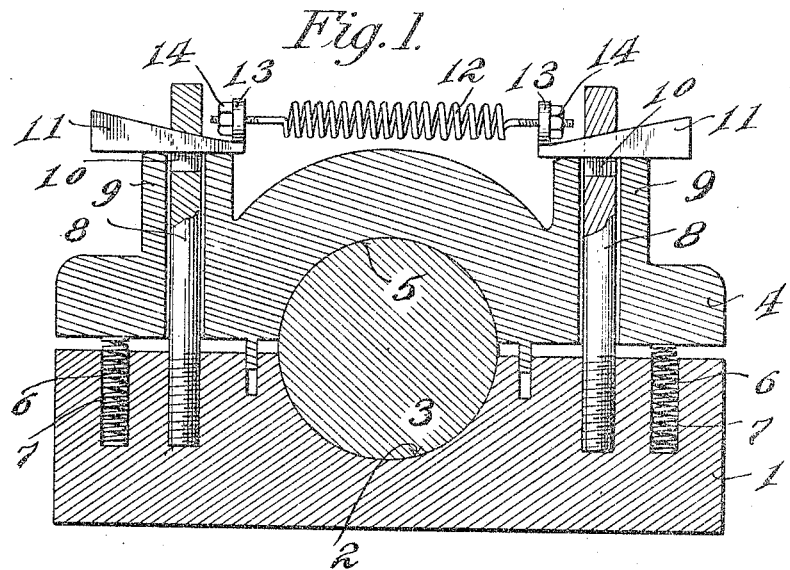
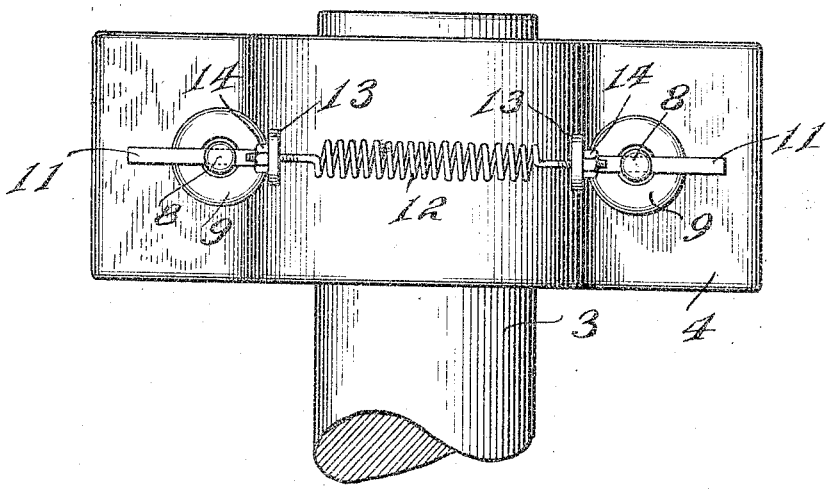
Witnesses
H. H. Lybrand
C. Brakeway
Inventor
Wrex A. Henderson
William C. Gilpin
Alonzo M. Gilpin
By Victor J. Evans
Attorney

UNITED STATES PATENT OFFICE.

WREX A. HENDERSON, WILLIAM C. GILPIN, AND ALONZO M. GILPIN, OF SAFFORD, ARIZONA TERRITORY.

SELF-ADJUSTING BEARING.

1,000,806.

Specification of Letters Patent.   Patented Aug. 15, 1911.

Application filed April 12, 1910.   Serial No. 555,066.

*To all whom it may concern:*

Be it known that we, WREX A. HENDERSON, WILLIAM C. GILPIN, and ALONZO M. GILPIN, citizens of the United States, residing at Safford, in the county of Graham and Territory of Arizona, have invented new and useful Improvements in Self-Adjusting Bearings, of which the following is a specification.

This invention relates to a shaft bearing of the self-adjusting type so as to automatically compensate for wear of the parts.

The invention has for one of its objects to improve and simplify the construction and operation of devices of this character so as to be comparatively simple and inexpensive to manufacture, reliable and efficient in use, and readily adjusted.

Another object of the invention is the provision of a novel arrangement of wedges which operate to hold the cap of the bearing against the shaft at all times with sufficient tension to prevent vibration and at the same time compensate for wear.

With these objects in view, and others as will appear as the description proceeds, the invention comprises the various novel features of construction and arrangement of parts which will be more fully described hereinafter and set forth with particularity in the claims appended hereto.

In the accompanying drawings, which illustrate one embodiment of the invention:—Figure 1 is a section of a bearing taken transversely to the axes of the shaft. Fig. 2 is a plan view of the bearing.

Similar reference characters are employed to designate corresponding parts throughout the several views.

Referring to the drawing, 1 designates the base of a bearing which has a semi-circular seat 2 for the shaft 3, and on this base 1 is a cap 4, which has a semi-circular recess 5, in which the shaft fits. The cap 4 rests on the upper ends of helical compression springs 6, which are held in vertical sockets 7 in the base 1. The cap is held against lateral displacement by bolts or studs 8 screwed into the base at opposite sides of the seat 2, and these studs extend through sleeves or tubular members 9 carried by the cap. The upper ends of the studs or members 8 are provided with slots 10 disposed adjacent the upper ends of the tubular members 9, and in these slots are wedges 11 which have their bottom faces resting on the members 9. The upper inclined faces of the wedges bear against the upper end walls of the slots 10 so that as the wedges are drawn longitudinally toward each other, they will act on the members 9 to depress the cap against the tension of the springs 6. These wedges are constantly urged inwardly by a spring 12 extening transversely to the shaft and over the top of the cap. The ends of the spring pass through lugs 13 on the inner ends of the wedges, and behind the lugs are nuts 14 screwed on the ends of the spring so that by adjusting the nuts, the spring can be set to any desired tension. It will thus be seen that the spring forms a common device for constantly urging the wedges in such a direction as to cause the cap to press against the shaft and thus automatically compensate for the wear of the bearing parts as well as the shaft. The device can be readily taken apart for repair or inspection, and the tension on the cap can be adjusted to a nicety.

From the foregoing description taken in connection with the accompanying drawing, the advantages of the construction and of the method of operation will be readily apparent to those skilled in the art to which the invention relates, and while we have described the principle of operation of the invention, together with the device which we now consider to be the best embodiment thereof, we desire to have it understood that the device shown is merely illustrative and that such changes may be made when desired as are within the scope of the claims.

What we claim as new and desire to secure by Letters Patent is:—

1. A bearing comprising a fixed section, a movable section coöperating therewith, a journal disposed between the sections, fixed parallel members fastened to the fixed section and extending through the movable section, said members being disposed at opposite sides of the journal, wages extending transversely through the members and bearing on the movable section, said wedges tapering inwardly toward each other, and a helical extension spring extending transversely to the journal and approximately in alinement with and between the wedges, and means for detachably and adjustably connecting the ends of the spring with the respective wedges for exerting substantially the same inward pull on the wedges and whereby the spring is supported wholly by the latter.

2. A bearing comprising a base section, a cap section, guide members on the base section, tubular members on the cap section through which the guide members extend, wedges disposed between the guide and tubular members, and a common device acting on both wedges to yieldingly urge the cap section toward the base section.

3. A bearing comprising a base section, a cap section, guide members on the base section, tubular members on the cap section through which the guide members extend, wedges disposed between the said members, and a spring disposed between the wedges and adjustably connected therewith for simultaneously moving the wedges in a direction to urge the cap section toward the base section.

4. A bearing comprising a base section, a cap section, guide members on the base section, tubular members on the cap section through which the guide members extend, wedges disposed between the said members, a spring disposed between the wedges and adjustably connected therewith for simultaneously moving the wedges in a direction to urge the cap section toward the base section, and yielding means between the base and cap sections tending to oppose the action of the said spring.

In testimony whereof we affix our signatures in presence of two witnesses.

WREX A. HENDERSON.
WILLIAM C. GILPIN.
ALONZO M. GILPIN.

Witnesses:
SYLVESTER E. TIPPETTS,
EZRA MADSEN.